(12) United States Patent
Ghabchi et al.

(10) Patent No.: US 11,845,699 B2
(45) Date of Patent: Dec. 19, 2023

(54) METHODS FOR MANUFACTURING COATED COMPOSITE MATERIALS

(71) Applicant: Blue Origin, LLC, Kent, WA (US)

(72) Inventors: Arash Ghabchi, Bothell, WA (US); Brendan Boyer, Snoqualmie, WA (US)

(73) Assignee: Blue Origin, LLC, Kent, WA (US)

( * ) Notice: Subject to any disclaimer, the term of this patent is extended or adjusted under 35 U.S.C. 154(b) by 177 days.

(21) Appl. No.: 17/468,356

(22) Filed: Sep. 7, 2021

(65) Prior Publication Data

US 2023/0075051 A1    Mar. 9, 2023

(51) Int. Cl.
*C04B 35/78*    (2006.01)
*C04B 35/622*    (2006.01)

(52) U.S. Cl.
CPC ............ *C04B 35/78* (2013.01); *C04B 35/622* (2013.01)

(58) Field of Classification Search
CPC .................................................. C04B 35/622
See application file for complete search history.

(56) References Cited

U.S. PATENT DOCUMENTS

| | | |
|---|---|---|
| 3,243,929 A | 4/1966 | Strandlund et al. |
| 3,910,374 A | 10/1975 | Holehouse |
| 3,948,346 A | 4/1976 | Schindler |
| 4,084,739 A | 4/1978 | Koltz et al. |
| 4,235,303 A | 11/1980 | Dhoore et al. |
| 4,257,998 A | 3/1981 | Diepenbrock, Jr. et al. |
| 4,265,955 A | 5/1981 | Harp et al. |
| 4,594,120 A | 6/1986 | Bourland, Jr. et al. |
| 4,687,691 A | 8/1987 | Kay |
| 4,910,065 A | 3/1990 | McKinney |
| 4,971,746 A | 11/1990 | Ferrer |
| 5,080,306 A | 1/1992 | Porter et al. |
| 5,362,527 A | 11/1994 | Harpell et al. |
| 5,445,861 A | 8/1995 | Newton et al. |

(Continued)

FOREIGN PATENT DOCUMENTS

| | | |
|---|---|---|
| DE | 10058339 A1 | 6/2002 |
| EP | 1340316 A1 | 9/2003 |
| WO | WO-2009032585 | 3/2009 |

OTHER PUBLICATIONS

U.S. Appl. No. 17/555,035, filed Dec. 17, 2021, Song et al.

(Continued)

*Primary Examiner* — Robert A Vetere
(74) *Attorney, Agent, or Firm* — Perkins Coie LLP (57) ABSTRACT

Composite materials and methods of manufacturing composite materials, such as for use in aerospace parts, are described herein. A representative method for manufacturing a coated composite material structure includes applying a plurality of material layers to a preform structure. The plurality of material layers can include at least one first material layer (including a first matrix precursor), and at least one second material layer (including a second matrix precursor and a coating precursor). The method can also include infusing the preform structure with the first and second matrix precursors and the coating precursor from the plurality of material layers. The method can further include heating the infused preform structure to concurrently form a composite material structure and a coating on at least a portion of the composite material structure.

27 Claims, 4 Drawing Sheets

(56) References Cited

U.S. PATENT DOCUMENTS

| | | | | |
|---|---|---|---|---|
| 5,455,000 | A | * | 10/1995 | Seyferth .............. B22F 7/04 |
| | | | | 419/36 |
| 5,460,864 | A | | 10/1995 | Heitkamp |
| 5,460,865 | A | | 10/1995 | Tsotsis |
| 5,575,402 | A | | 11/1996 | Botsolas |
| 5,604,010 | A | | 2/1997 | Hartz et al. |
| 5,662,761 | A | | 9/1997 | Middelman et al. |
| 5,685,940 | A | | 11/1997 | Hopkins et al. |
| 5,784,919 | A | | 7/1998 | Mattson |
| 5,785,919 | A | | 7/1998 | Wilson |
| 5,830,548 | A | | 11/1998 | Andersen et al. |
| 5,895,699 | A | | 4/1999 | Corbett et al. |
| 6,114,652 | A | | 9/2000 | Clarke et al. |
| 6,180,206 | B1 | | 1/2001 | Kain, Jr. |
| 6,182,787 | B1 | | 2/2001 | Kraft et al. |
| 6,235,655 | B1 | | 5/2001 | Jozaki |
| 6,509,081 | B1 | | 1/2003 | Diamond |
| 6,871,725 | B2 | | 3/2005 | Johnson |
| 7,197,852 | B2 | | 4/2007 | Grillos |
| 7,434,659 | B2 | | 10/2008 | Ayle |
| 7,785,098 | B1 | | 8/2010 | Appleby et al. |
| 7,998,389 | B2 | | 8/2011 | Burchett et al. |
| 8,282,040 | B1 | | 10/2012 | Westman et al. |
| 8,375,839 | B2 | | 2/2013 | Landi |
| 8,408,358 | B1 | | 4/2013 | Hermiller et al. |
| 8,475,894 | B2 | | 7/2013 | Noble et al. |
| 8,491,743 | B2 | | 7/2013 | Pham et al. |
| 8,511,429 | B1 | | 8/2013 | Yu et al. |
| 8,696,843 | B1 | | 4/2014 | Dean |
| 8,720,817 | B1 | | 5/2014 | Kismarton et al. |
| 9,079,674 | B1 | | 7/2015 | Grillos et al. |
| 9,469,418 | B1 | | 10/2016 | Grillos |
| 11,148,204 | B2 | | 10/2021 | Colin |
| 2001/0015157 | A1 | | 8/2001 | Neal |
| 2002/0070077 | A1 | | 6/2002 | Porte et al. |
| 2004/0067364 | A1 | | 4/2004 | Ishikawa et al. |
| 2004/0156478 | A1 | | 8/2004 | Appleby et al. |
| 2005/0097892 | A1 | * | 5/2005 | Carper .............. F02K 1/12 |
| | | | | 60/771 |
| 2006/0067364 | A1 | | 3/2006 | Jung |
| 2006/0108058 | A1 | | 5/2006 | Chapman et al. |
| 2006/0188696 | A1 | | 8/2006 | Grose et al. |
| 2007/0238379 | A1 | | 10/2007 | Bhatnagar et al. |
| 2008/0179448 | A1 | | 7/2008 | Layland et al. |
| 2008/0256960 | A1 | | 10/2008 | Greason et al. |
| 2009/0263627 | A1 | | 10/2009 | Hand et al. |
| 2010/0078985 | A1 | | 4/2010 | Mahoney et al. |
| 2010/0170746 | A1 | | 7/2010 | Restuccia et al. |
| 2010/0243803 | A1 | | 9/2010 | Westre et al. |
| 2010/0243903 | A1 | | 9/2010 | Fahr et al. |
| 2010/0276545 | A1 | | 11/2010 | Chavagnac et al. |
| 2011/0012290 | A1 | | 1/2011 | Burchett et al. |
| 2011/0133025 | A1 | | 6/2011 | Vauchel et al. |
| 2011/0189440 | A1 | | 8/2011 | Appleby et al. |
| 2012/0037449 | A1 | | 2/2012 | Ayle |
| 2012/0174748 | A1 | | 7/2012 | Landi |
| 2014/0077037 | A1 | | 3/2014 | Hand |
| 2014/0165361 | A1 | | 6/2014 | Stulc et al. |
| 2017/0342549 | A1 | * | 11/2017 | Kashyap .......... C04B 35/62886 |
| 2019/0299290 | A1 | | 10/2019 | Kuhns |

OTHER PUBLICATIONS

Jacques Valverde—Thierry Pichon, "From IXV To Space Rider: CMC Thermal Protection System Evolutions," Ariane Group, HT-CMC/10th, Bordeaux, Sep. 22-26, 2019, 14 pages.

* cited by examiner

METHODS FOR MANUFACTURING COATED COMPOSITE MATERIALS

TECHNICAL FIELD

The present technology relates generally to methods for manufacturing coated composite materials, such as for use in aerospace parts.

BACKGROUND

Aerospace vehicle parts, such as rocket engines and thermal protection systems, are exposed to high temperatures and oxidizing environments during operation. Composite materials such as ceramic matrix composites (CMCs) have been developed to withstand these extreme conditions. However, conventional processes for manufacturing CMCs are generally expensive, have long lead times (e.g., several months), and may not be suitable for certain geometries (e.g., thick parts). Moreover, conventional techniques for applying protective coatings to CMCs may require additional post-processing steps that further increase manufacturing time and cost. Such coatings may also exhibit poor adhesion to the underlying material and may be vulnerable to spalling during use. Accordingly, there remains a need for improved high temperature, high performance materials.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Aspects of the present technology are directed generally to methods for manufacturing coated composite materials, such as for use in aerospace parts. In several of the embodiments described below, methods of manufacturing a coated composite material structure include applying a plurality of material layers to a preform structure. The material layers can include at least one first material layer including a first matrix precursor (e.g., a ceramic-forming resin or polymer), and at least one second material layer including a second matrix precursor (which may be the same as or different from the first matrix precursor) and a coating precursor (e.g., a silicon carbide (SiC) precursor). The method can also include infusing the preform structure with the matrix precursors and the coating precursor from the material layers (e.g., via a resin film infusion (RFI) process). Subsequently, the infused preform structure can be heated to form a composite material structure (e.g., a ceramic matrix composite (CMC) structure). The heating can concurrently form a coating (e.g., a SiC coating) on at least a portion of the composite material structure. The coatings fabricated according to the processes described herein are expected to exhibit improved adhesion to the underlying structure. Additionally, the techniques described herein can reduce the time and costs associated with manufacturing coated composite materials.

Certain details are set forth in the following description and in FIGS. 1-4 to provide a thorough understanding of various embodiments of the present technology. In other instances, well-known structures, materials, operations, and/or systems often associated with manufacturing of CMCs or other composite materials are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. Additionally, the coated composite material structures of the present technology can be used in contexts other than aerospace, for example, power generation or other industries in which high temperature processes are utilized.

The accompanying Figures depict embodiments of the present technology and are not intended to limit the scope of the present technology. The sizes of various depicted elements are not necessarily drawn to scale, and these various elements may be arbitrarily enlarged to improve legibility. Component details may be abstracted in the Figures to exclude details such as the position of components and certain precise connections between such components when such details are unnecessary for a complete understanding of how to make and use the present technology. Many of the details, dimensions, angles and other features shown in the Figures are merely illustrative of particular embodiments of the technology. Accordingly, other embodiments can have other details, dimensions, angles and features without departing from the present technology. In addition, those of ordinary skill in the art will appreciate that further embodiments of the present technology can be practiced without several of the details described below.

Figure 1:
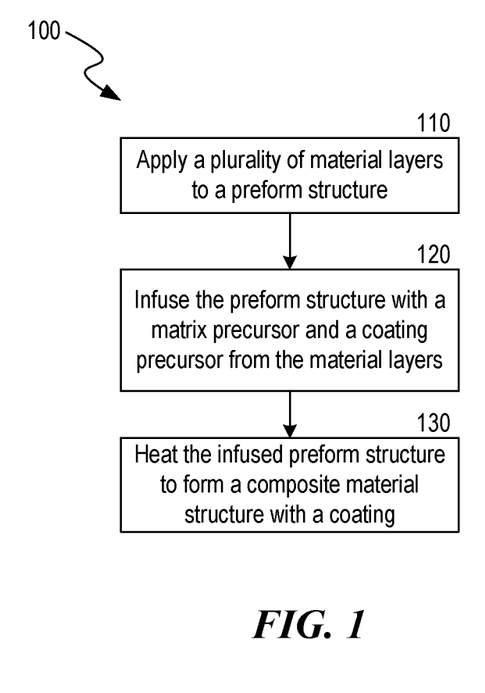
FIG. 1 is flow diagram of a method for manufacturing a coated composite material in accordance with embodiments of the present technology.

FIG. 1 is a flow diagram of a method 100 for manufacturing a coated composite material structure in accordance with embodiments of the present technology. In some embodiments, the coated composite material structure is intended for use in an aerospace vehicle. For example, the coated composite material structure can be a component of a rocket engine, jet engine, or thermal protection system. As another example, the coated composite material structure can be a component of a power generator or other system that is exposed to high temperatures, oxidizing conditions, and/or mechanical stresses. As described in greater detail below, the coated composite material structure can be made partially or entirely of a CMC. A CMC generally includes a reinforcement material (e.g., fibers, whiskers, particles) embedded in a matrix material. The reinforcement material and matrix material can each be made of any suitable material, such as carbon or SiC. Examples of CMCs suitable for use in the present technology include, but are not limited to, carbon fibers embedded in a carbon matrix ("C/C"), SiC fibers embedded in a SiC matrix ("SiC/SiC"), and carbon fibers embedded in a SiC matrix ("C/SiC"). The coating can be configured to protect the underlying composite material structure, e.g., from oxidation and/or other environmental conditions. For example, the coating can be a SiC coating or other coating materials.

Figure 2:
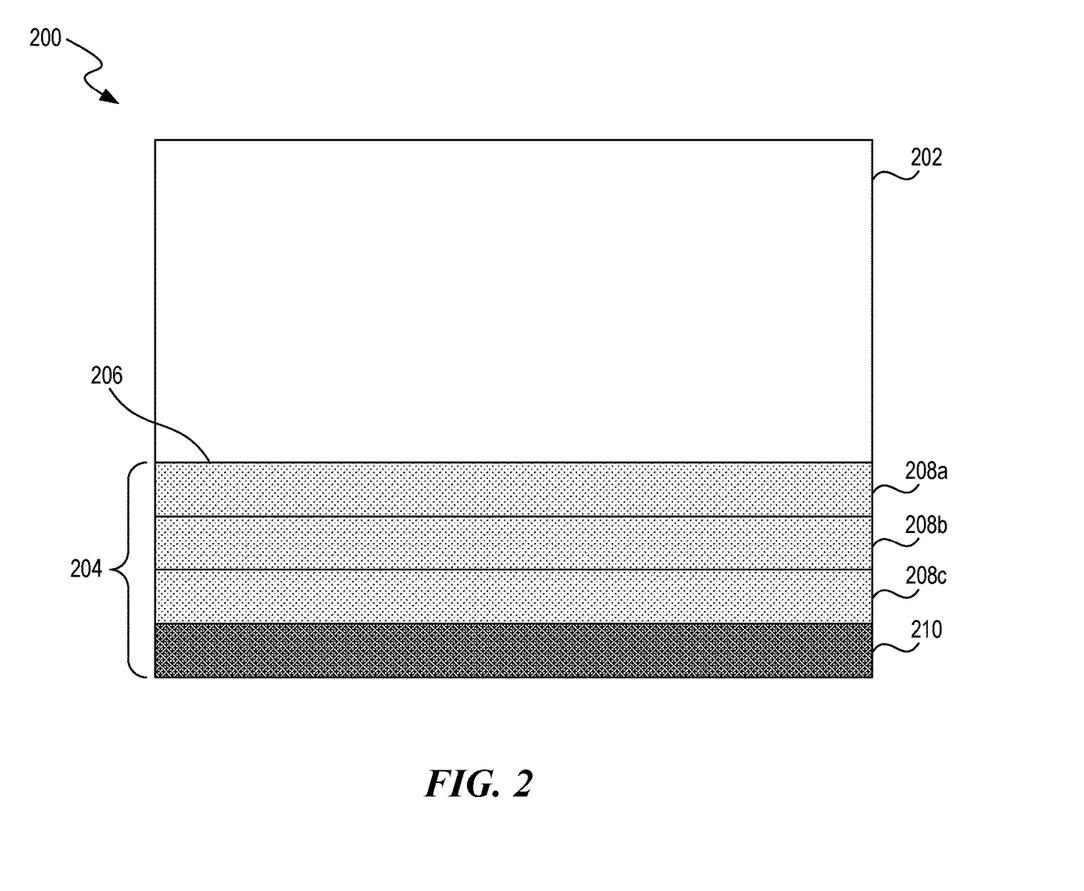
FIG. 2 is a schematic cross-sectional view of a material assembly including a preform structure and a plurality of material layers configured in accordance with embodiments of the present technology.

Block 110 of the method 100 includes applying a plurality of material layers to a preform structure. For example, FIG. 2 is a schematic cross-sectional view of a material assembly 200 including a preform structure 202 and a plurality of material layers 204 configured in accordance with embodiments of the present technology. The preform structure 202 can be or include a precursor for a composite material, such as a CMC (e.g., C/C, SiC/SiC, C/SiC), and can be prepared in accordance with techniques known to those of skill in the art. For example, the preform structure 202 can include a reinforcement material (e.g., carbon or SiC fibers) that is embedded in a matrix material (e.g., carbon or SiC) or a precursor to the matrix material (e.g., a resin or polymer). In some embodiments, the preform structure 202 has already undergone one or more heat treatment steps to cure and/or carbonize the material of the preform structure 202. Optionally, the previous heat treatment step(s) can be performed at temperatures that produce little or no graphitization of the material of the preform structure 202, such as temperatures less than or equal to 1650° C., 1600° C., 1500° C., 1400° C., 1300° C., 1200° C., 1100° C., 1000° C., 900° C., 800° C., or 700° C. After the heat treatment, the preform structure 202 can include a large number of pores and/or microcracks suitable for infiltration by an additional material. For example, after the heat treatment, the preform structure 202 can exhibit a mass loss of at least 5%, 10%, 15%, or 20%.

The material layers 204 can serve as a source of material for densifying the preform structure 202. The material layers 204 can be provided in various formats suitable for application to a surface 206 of the preform structure 202, such as plies, sheets, films, tapes, etc. The material layers 204 can be cut or otherwise adjusted to have dimensions the same or similar to those of the surface 206 of the preform structure 202. Although FIG. 2 illustrates the material layers 204 as being stacked underneath the preform structure 202, in other embodiments, the preform structure 202 and material layers 204 can be arranged differently (e.g., the material layers 204 can be positioned on top of or against a lateral side of the preform structure 202).

In some embodiments, the material layers 204 include different types of materials, such as a plurality of first material layers 208a-c (collectively, "first material layers 208") and at least one second material layer 210. The first material layers 208 can each include a matrix precursor that can be converted into a matrix material for a CMC or other composite material. For example, the matrix precursor can be a polymer or resin that can be converted into a ceramic matrix (e.g., a carbon or SiC matrix) through heat treatment, as discussed further below. The matrix material formed from the matrix precursor can be the same as the matrix material of the preform structure 202, or can be a different matrix material. Examples of matrix precursors suitable for use with the present technology include, but are not limited to: polycarbosilanes, polysilazanes, benzoxazine resins, bismaleimide resins, cyanate ester resins, epoxy resins, phenolic resins, polybutadiene resins, polyester resins, polyimide resins, silicon oxycarbide resins, or vinyl ester resins.

The second material layer 210 includes a coating precursor embedded in a matrix precursor. The coating precursor can be a material that is converted into a coating upon heat treatment. For example, the coating precursor can include a material such as silicon or silica ($SiO_2$) that is reduced and subsequently forms 2SiC when heated. As another example, the coating precursor can include carbon. In some embodiments, the coating precursor includes multiple different materials, e.g., silicon and carbon, $SiO_2$ and carbon, other combinations of silicide-forming constituents, etc. The coating precursor can be provided in any suitable format, such as a powder, particles, flakes, fibers, etc. In some embodiments, the coating precursor is a solid material that is mixed, embedded, or otherwise combined with the matrix precursor to form the second material layer 210.

In some embodiments, the coating precursor is included only in the second material layer 210, and the first material layers 208 do not include any coating precursor. In other embodiments, however, one or more of the first material layers 208 can also include a coating precursor different from the coating precursor of the second material layer 210. In such embodiments, the final composite material structure can include multiple different coating layers (e.g., two, three, four, or more different coating layers).

The matrix precursor of the second material layer 210 can be the same as the matrix precursor of the first material layers 208, or can be a different matrix precursor. In some embodiments, for example, the matrix precursor of the second material layer 210 is configured to form a carbon or SiC matrix when heated to a suitable temperature. The temperature range at which the matrix precursor is converted to the matrix material can be the same as or similar to the temperature range for converting the coating precursor into the coating. This allows the coating and the matrix to be concurrently formed in a single processing step, as described in greater detail below.

The first and second material layers 208, 210 can be arranged in any suitable configuration. For example, in the illustrated embodiment, the first material layers 208 are positioned between the preform structure 202 and the second material layer 210. As can be seen in FIG. 2, the second material layer 210 is the bottommost layer and is further away from the surface 206 of the preform structure 202 than the first material layers 208. This arrangement allows the coating precursor of the material layer 210 to be localized near the surface 206 of the preform structure 202 during the subsequent infusion process, as described further below.

The material layers 204 can be applied to the preform structure 202 in accordance with any suitable technique known to those of skill in the art, including manual, semi-automated, or fully-automated layup processes. In some embodiments, for example, the first and second material layers 208, 210 are sequentially applied to the preform structure 202. For example, the first material layers 208 can be applied to the surface 206 of the preform structure 202, then the second material layer 210 is applied to the lowermost first material layer 208c. Alternatively, the first and second material layers 208, 210 can be assembled into a stack that is subsequently applied as a unit to the surface 206 of the preform structure 202.

Although FIG. 2 illustrates the assembly 200 as having three first material layers 208a-c and a single second material layer 210, in other embodiments, the assembly 200 can include a different number of first and/or second material layers 208, 210. For example, the assembly 200 can include a single first material layer 208 and a single second material layer 210, a single first material layer 208 and multiple second material layers 210, or any other suitable combination thereof. As another example, the assembly 200 can include one, two, four, five, or more first material layers 208; and/or two, three four, five, or more second material layers 210. In some embodiments, the first material layers 208 are optional and can be omitted. Additionally, the first and second material layers 208, 210 can each independently have any suitable thickness. For example, each first and/or second material layer 208, 210 can have a thickness within a range from 0.005 inches to 0.032 inches. The number and thicknesses of the first and/or second material layers 208, 210 can be determined based on various factors, such as the thickness of the preform structure 202, the density or porosity of the preform structure 202, the desired mass of material to be infused into the preform structure 202, the desired final thickness of the composite material structure, and/or the desired final density or porosity of the composite material structure.

Optionally, the assembly 200 can include additional material layers that are not shown in FIG. 2. For example, the assembly 200 can include one or more additional material layers between the uppermost first material layer 208a and the surface 206 of the preform structure 202, between individual first material layers 208, between the lowermost first material layer 208c and the second material layer 210, and/or underneath the second material layer 210. In some embodiments, the one or more additional material layers include additional precursors (e.g., additional matrix and/or coating precursors), catalysts, reinforcement materials, or any other suitable materials for forming the composite material structure.

Referring again to FIG. 1, at block 120, the preform structure is infused with a matrix precursor (e.g., resin) and a coating precursor from the material layers. The infusion can be performed using any suitable process, such as a liquid infiltration process and/or an RFI process. In some embodiments, for example, the matrix precursor is initially in a solid or semi-solid state, and the infusion process includes heating the preform structure and material layers to a first temperature so that the matrix precursor partially or fully liquifies and flows into the preform structure (e.g., into pores and/or microcracks resulting from one or more previous heat treatments). The coating precursor can be mixed with the matrix precursor so that it also infiltrates the preform structure when the matrix precursor is melted. The infusion temperature can be sufficiently low that the matrix precursor does not cure and/or carbonize during infiltration. For example, the temperature can be within a range from 50° C. to 250° C., such as 50° C., 75° C., 100° C., 125° C., 150° C., 175° C., 200° C., 225° C., or 250° C. Optionally, a vacuum can be applied to the preform structure and material layers to aid in drawing the matrix precursor and coating precursor into the preform structure.

In some embodiments, after the preform structure has been infused with the matrix precursor and coating precursor, the infused preform structure is cured to re-solidify the matrix precursor and prepare the infused preform structure for subsequent processing. Curing can occur at any suitable temperature, such as a temperature within a range from 150° C. to 500° C. (e.g., 150° C., 200° C., 250° C., 300° C., 350° C., 400° C., 450° C. or 500° C.). The curing temperature can be higher than the infusion temperature. However, the curing temperature can be low enough to prevent the infused preform structure from carbonizing and/or graphitizing. In other embodiments, however, the curing process is optional and may be omitted.

Figure 3:
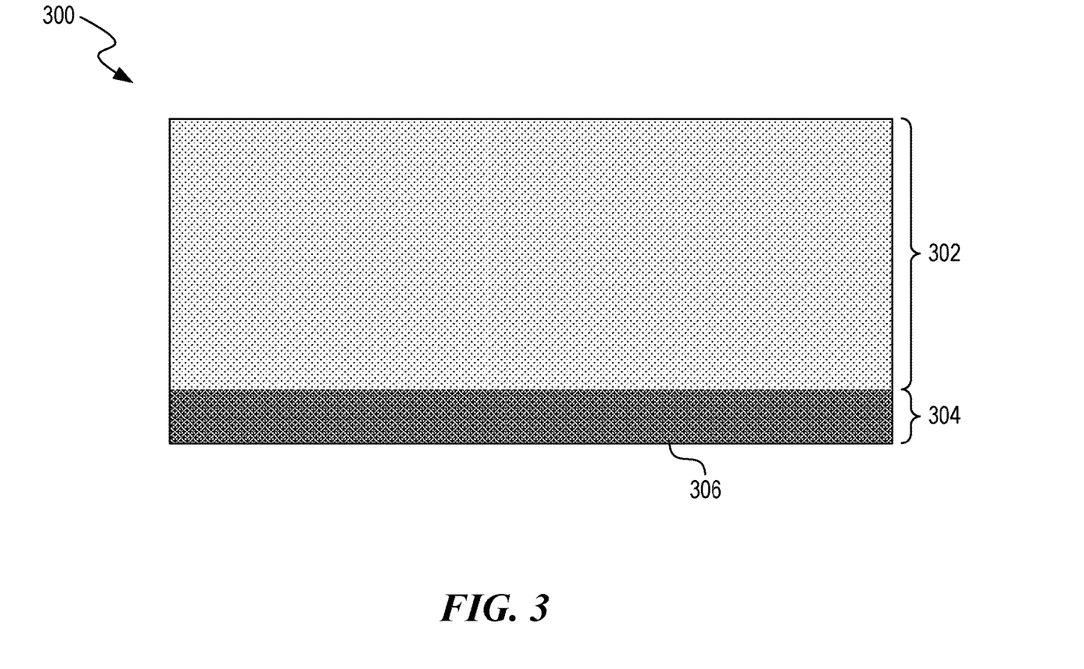
FIG. 3 is a schematic cross-sectional view of an infused preform structure formed from the material assembly of FIG. 2 and configured in accordance with embodiments of the present technology.

FIG. 3 illustrates a representative infused preform structure 300 configured in accordance with embodiments of the present technology. The infused preform structure 300 can be formed from the assembly 200 of FIG. 2 using the processes described in connection with block 120 of FIG. 1. In the illustrated embodiment, the infused preform structure 300 includes an inner portion 302 and an outer portion 304 adjacent to a surface 306 of the infused preform structure 300. After infusion has occurred, the inner portion 302 includes the matrix precursor from the first material layers (e.g., first material layers 208 of FIG. 2), and the outer portion 304 includes the coating precursor and matrix precursor from the second material layer (e.g., second material layer 210 of FIG. 2). In some embodiments, the infused preform structure 300 has a stratified composition in which the coating precursor is localized at or toward the outer portion 304 of the preform structure 300 near the surface 306, and the inner portion 302 includes little or no coating precursor. The thickness of the outer portion 304 can be varied as desired based on the number and/or thicknesses of the material layers applied to the preform structure, as previously described.

Referring again to FIG. 1, at block 130, the infused preform structure is heated to form a composite material structure with a coating. The infused preform structure can be heated to a second temperature sufficient to carbonize and/or graphitize the matrix precursor into a matrix material, such as a CMC matrix material (e.g., a SiC or carbon matrix). For example, the temperature can be greater than or equal to 1450° C., 1500° C., 1550° C., 1600° C., 1650° C., 1700° C., 1750° C., 1800° C., 1850° C., 1900° C., 1950° C., or 2000° C. The heat treatment can also concurrently convert the coating precursor into a coating material, in accordance with chemical and process parameters (e.g., time and/or temperature) known to those of skill in the art. Accordingly, the coating can be formed in situ on the composite material structure in a single heat treatment process. The coated composite material structure can subsequently be machined or otherwise processed to form a completed part (e.g., an aerospace part).

Figure 4:
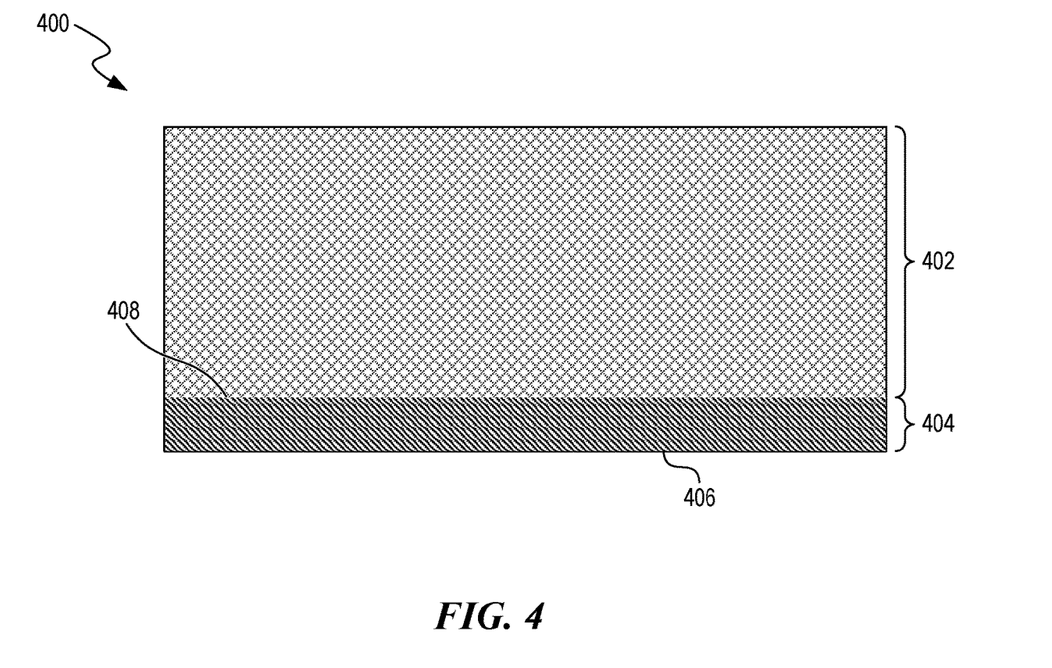
FIG. 4 is a schematic cross-sectional view of a composite material structure with a coating formed from the infused preform structure of FIG. 3 and configured in accordance with embodiments of the present technology.

FIG. 4 illustrates a representative coated composite material structure 400 configured in accordance with embodiments of the present technology. The composite material structure 400 can be formed from the infused preform structure 300 of FIG. 3 using the processes described in connection with block 130 of FIG. 1. As shown in FIG. 4, the composite material structure 400 includes an inner portion 402, and a coating 404 extending partially or entirely over the inner portion 402. As a result, the surface 406 of the composite material structure 400 can be partially or entirely covered by the coating 404, thus protecting the inner region 402 from oxidation and/or other environmental conditions.

In some embodiments, the inner portion 402 is made of a CMC (e.g., C/C, C/SiC, SiC/SiC), and the coating 404 is made of a carbide (e.g., SiC) or silicide. The coating 404 can have different characteristics than the inner portion 402, e.g., with respect to chemistry, density, and/or structure. Because the coating 404 is formed concurrently with the inner portion 402, the interface region 408 between the coating 404 and the inner portion 402 can provide a gradual transition from the material of the coating 404 to the material of inner portion 402, rather than being a distinct boundary with a sharp transition between the coating 404 and the inner portion 402. Accordingly, the coating 404 is expected to exhibit improved adhesion and resistance to spalling and/or delamination.

The method 100 of FIG. 1 can allow aerospace parts or other components with high temperature capabilities to be produced in a rapid and cost-efficient manner. Rather than requiring repeated cycles of material deposition/infiltration and heat treatment, the processes described herein can produce a coated composite material structure from a preform structure with a single infusion and heat treatment process. In some embodiments, the coated composite material structure can be fabricated using the method 100 of FIG.

1 with a lead-up time of no more than 5 weeks, 6 weeks, 7 weeks, 8 weeks, 9 weeks, or 10 weeks.

The processes described herein with reference to FIGS. 1-4 can be performed using any suitable manufacturing system and/or apparatus. For example, the heat treatment processes discussed above (e.g., curing, carbonization, and/or graphitization) can be performed using an autoclave and inert atmosphere furnace, or other suitable system or apparatus. Vacuum application can be performed using a vacuum bagging setup (e.g., a mold, vacuum bagging film, vacuum pump, release film, sealant, etc.). Other techniques known to those skilled in the art may also be used.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology, as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. For example, although the embodiments herein are described primarily with respect to CMCs, the present technology may also be applied to polymer matrix composites or other types of advanced composite materials. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A method for manufacturing a coated composite material structure, the method comprising:
   applying a plurality of material layers to a preform structure, the plurality of material layers including: at least one first material layer including a first matrix precursor, and at least one second material layer including a second matrix precursor and a coating precursor;
   infusing the preform structure with the first matrix precursor, second matrix precursor, and the coating precursor from the plurality of material layers; and
   heating the infused preform structure to concurrently form a composite material structure and a coating on at least a portion of the composite material structure.

2. The method of claim 1, wherein infusing the preform structure with the first matrix precursor, second matrix precursor, and the coating precursor comprises:
   heating the plurality of material layers to partially or fully liquify the first matrix precursor and the second matrix precursor,
   wherein the first matrix precursor, the second matrix precursor, and coating precursor infuse into the preform structure.

3. The method of claim 2, wherein the plurality of material layers is heated to a temperature from 50° C. to 250° C.

4. The method of claim 1, wherein the infused preform structure is heated to a temperature of at least 1450° C.

5. The method of claim 1, further comprising pre-treating the preform structure at least once by heating the preform structure prior to applying the plurality of material layers.

6. The method of claim 5, wherein the preform structure is heated to a temperature of 1650° C. or less.

7. The method of claim 1, wherein the first matrix precursor and second matrix precursor have a common chemical composition.

8. The method of claim 1, wherein the first matrix precursor and second matrix precursor have a different chemical composition.

9. The method of claim 1, wherein the first matrix precursor and the second matrix precursor each include a resin individually selected from the group consisting of polycarbosilane resins, polysilazane resins, benzoxazine resins, bismaleimide resins, cyanate ester resins, epoxy resins, phenolic resins, polybutadiene resins, polyester resins, polyimide resins, silicon oxycarbide resins, vinyl ester resins, and combinations thereof.

10. The method of claim 1, wherein the coating precursor includes a carbide coating precursor.

11. The method of claim 10, wherein the coating precursor is a carbide coating precursor.

12. The method of claim 1, further comprising using the coated composite material structure as a component of a rocket engine.

13. The method of claim 1, further comprising using the coated composite material structure as a component of a jet engine.

14. The method of claim 1, further comprising using the coated composite material structure as a component of a power generator.

15. A method for manufacturing a carbide-coated ceramic matrix composite (CMC) structure, the method comprising:
   applying at least one first resin film layer to a carbonized preform structure, the at least one first resin film layer including a first resin;
   applying at least one second resin film layer to the at least one first resin film layer, the at least one second resin film layer including a second resin and a carbide coating precursor;
   heating the carbonized preform structure, the at least one first resin film layer, and the at least one second resin film layer to a first temperature to infuse the carbonized preform structure with the first resin, the second resin, and the carbide coating precursor; and
   heating the infused carbonized preform structure to a second temperature to concurrently form a CMC structure and a carbide coating on at least a portion of the CMC structure.

16. The method of claim 15, further comprising pre-treating the carbonized preform structure at least once by heating the carbonized preform structure prior to applying the at least one first resin film layer.

17. The method of claim 16, wherein the carbonized preform structure is heated to a temperature of 1650° C. or less.

18. The method of claim 15, wherein the first temperature is 50° C. to 250° C.

19. The method of claim 15, wherein the second temperature is at least 1450° C.

20. The method of claim 15, wherein the first resin and the second resin have a common chemical composition.

21. The method of claim 15, wherein the first resin and the second resin have a different chemical composition.

22. The method of claim 15, wherein the first resin and the second resin are individually selected from the group consisting of polycarbosilane resins, polysilazane resins, benzoxazine resins, bismaleimide resins, cyanate ester resins, epoxy resins, phenolic resins, polybutadiene resins, polyester resins, polyimide resins, silicon oxycarbide resins, vinyl ester resins, and combinations thereof.

23. The method of claim 15, further comprising curing the infused carbonized preform structure prior to heating the infused carbonized preform structure to the second temperature.

24. The method of claim 23, wherein curing the infused carbonized preform structure comprises heating the infused carbonized preform structure to a temperature from 150° C. to 500° C.

25. The method of claim 15, further comprising using the CMC structure as a component of a rocket engine.

26. The method of claim 15, further comprising using the CMC structure as a component of a jet engine.

27. The method of claim 15, further comprising using the CMC structure as a component of a power generator.

* * * * *